Dec. 12, 1939.    R. DAUB    2,183,011
RADIAL ENGINE VALVE GEAR
Filed Aug. 25, 1938
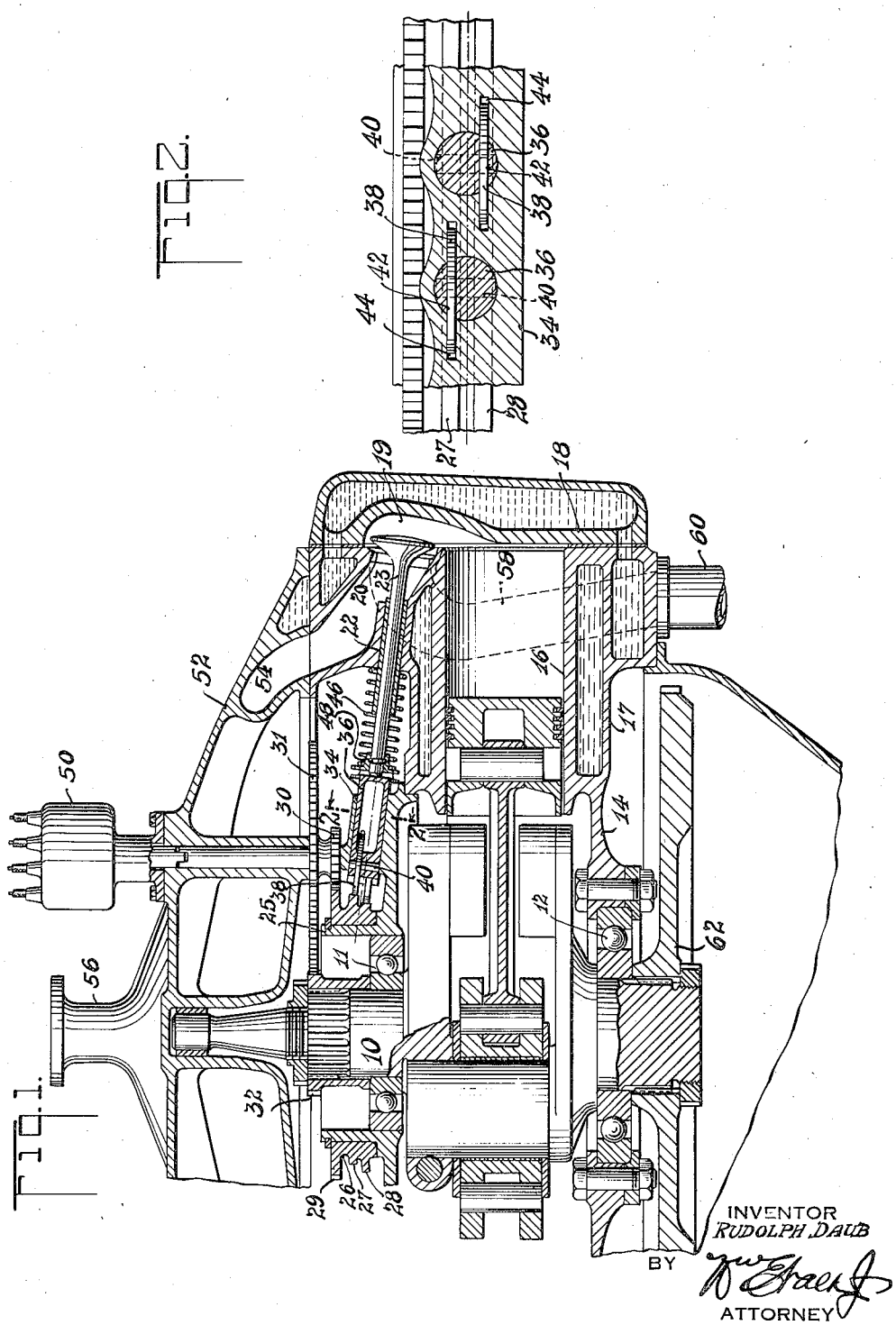
INVENTOR
RUDOLPH DAUB
BY
ATTORNEY Patented Dec. 12, 1939

2,183,011

UNITED STATES PATENT OFFICE 2,183,011

RADIAL ENGINE VALVE GEAR

Rudolph Daub, Paterson, N. J., assignor to Wright Aeronautical Corporation, a corporation of New York Application August 25, 1938, Serial No. 226,628

5 Claims. (Cl. 123—55)

This invention relates to valve gears for internal combustion engines particularly relating to engines of the radial cylinder type. In adapting radial cylinder engines to automotive purposes, it is desirable to use cylinders of the L-head type in the interest of reducing the overall diameter of the engine, in simplifying the valve operating mechanism and in utilizing known improvements in cylinder head and combustion chamber design. The most direct valve operating means for a radial engine consists in the use of an annular cam element concentric with the engine shaft, having cam plates thereon for exhaust and inlet valves respectively, the cam annulus being driven at an appropriate speed with respect to the engine shaft to obtain proper valve timing. Since the exhaust and inlet cams are axially spaced it is necessary to provide cam followers coplanar with respective cams but ordinarily this would lead to angular displacement of the valve tappets and valve stems requiring a plurality of machining setups to form the valve guides and cam follower guides on appropriate angles. Accordingly, it is an object of this invention to provide a novel form of cam follower and tappet assembly for use particularly with radial cylinder engines. A further object is to provide a valve operating mechanism for L-head radially disposed cylinders. Still another object is to provide a cam follower and guide therefor which coact to hold the cam follower from turning in its guide. Further objects will become apparent in reading the annexed specification in connection with the drawing in which similar numbers indicate similar parts, and in which:

Fig. 1 is an axial section through a portion of a radial cylinder engine, and

Fig. 2 is an enlarged section on the line 2—2 of Fig. 1.

The particular type of engine herein shown comprises a vertically disposed crankshaft 10 mounted in bearings 11 and 12 in a crankcase 14, the latter having integral therewith a plurality of radially disposed cylinders one of which is indicated at 16. The several cylinders are water-jacketed as at 17 and each is provided with a jacketed cylinder head 18 formed with a valve pocket and combustion space 19 beneath which valve seats 20 are formed, thus defining an L-head cylinder. The crankcase 14 is formed with valve guides 22 inclined with respect to the cylinder axis and carrying valves 23 adapted to seat upon the valve seats 20. It is contemplated that the axis of each valve guide 22 and valve seat 20 is radial with respect to the crankshaft axes but as shown, these elements are axially inclined to allow the valve head to lie within the combustion chamber while the valve stem is directed toward the crankshaft at a point without the crankshaft bearing 11.

Upon an extension 25 of the crankcase is journalled a cam annulus 26 having axially spaced lobed cams formed thereon as indicated at 27 and 28, these cams respectively comprising inlet and exhaust valve operating devices. The cam annulus 26 is driven through a gear train 29, 30, 31 from a gear 32 splined to the crankshaft.

The crankcase 14 is formed with a valve tappet guide 34 coaxial with the valve guide 22, the axis thereof passing between the cams 27 and 28 as shown. In this connection it should be noted that all of the several valves and tappets have axes of identical slope, these axes thereby comprising elements of a flat cone whose apex is on the crankshaft axis. Each guide 34 receives a tappet 36 provided at its outer end with an abutment contacting the end of the valve stem and provided at its inner end with a cam follower wheel 38 journalled on a crosspin 40 passing crosswise through the cam follower. The wheel is disposed in a slot 42 displaced from the axis of the cam follower as shown in Fig. 2, said displacement amounting to one-half the distance between the cams 27 and 28. Thus, all tappets for inlet valves will have their cam followers so displaced as to engage the cam 27 while all tappets for exhaust valves will have their tappets so displaced as to contact the cam 28. This is clearly shown in Fig. 2 wherein the cam followers 38, although similar parts, are oppositely disposed to contact respective cams. The valve tappet guides, which are rigid with the crankcase 14, are slotted as at 44 to receive those portions of the cam followers 38 which are outwardly disposed from the end of the tappet 36 thus keying respective valve tappets from rotation and assuring that the several cam followers will at all times stay in alignment with their cams. Further, the provision of the slots 44 assures proper assembly of the tappets for either intake or exhaust, although the tappets with their cam followers are identical parts per se.

The valve 23 is provided with the conventional valve spring 46 and valve spring lock 48. The gear 31 forming part of the cam drive may be utilized for driving additional engine accessories such as the distributor 50, the latter accessory along with others which may be necessary being carried by an accessory section 52 suitably attached to the main crankcase 14. The intake valve ports leading from the several valve seats 20 are adapted to coact with cored passages 54 in the accessory section, these leading if desired to a central duct 56 upon which the carburetor may be mounted. Exhaust ducts on the other hand, one of which is indicated in dotted lines at 58, may pass through the engine between the engine cylinders to connect with exhaust pipes such as 60. The lower end of the crankshaft is provided with driving devices such as 62 from which power delivered by the engine may be led to the apparatus to be driven.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a radial cylinder engine comprising a crankshaft and pistons reciprocable in the cylinders connected to the shaft, a cam annulus concentric with the shaft to one side of the cylinders, said annulus having axially spaced cams thereon, one for intake and another for exhaust, valves for each cylinder having tappets borne for reciprocating in the engine casing, said tappets lying axially in a common cone of revolution struck about the crankshaft axis, said cone intersecting said cam annulus between the exhaust and intake cams, and a camfollower eccentrically mounted on each tappet for engagement with one or the other of said cams.

2. In a radial cylinder engine comprising a power shaft, a cam annulus concentric with the shaft having axially spaced ring cams thereon, a plurality of substantially radially disposed substantially coplanar valve tappets mounted for reciprocation in the engine cylinders the plane thereof passing between the cams of said annulus, and camfollower wheels journalled in respective tappets disposed alternately on opposite sides of the plane of said tappet axes for engagement with respective cams.

3. In an engine, spaced parallel cam tracks, a row of tappets having the plane of their axes passing between said cam tracks, and offset camfollowers borne by said tappets, each camfollower being offset to operatively engage one of said cam tracks.

4. In a radial cylinder engine having cylinders of the L-head type including valves inclined relative to their cylinder axes, the axes of the several valves comprising elements of a cone, a tappet for each valve coaxial therewith, a follower on each tappet offset from the tappet axis, certain of the followers being offset to one side and other followers being offset to the other side of said cone, and a pair of cams one alined with said first followers and the other alined with said other followers.

5. In a radial cylinder engine including axially spaced exhaust and inlet cam annuli concentric with the engine, a plurality of substantially radially disposed substantially coplanar valve tappets encircling the cams the plane thereof lying between the planes of said cam annuli, and camfollowers on respective tappets offset from the camfollower plane to one or the other of the cam annulus planes alternately engaging said inlet and exhaust cams.

RUDOLPH DAUB.